United States Patent [19]

Hawkinson

[11] 4,428,998
[45] Jan. 31, 1984

[54] LAMINATED SHIELD FOR MISSILE STRUCTURES AND SUBSTRUCTURES

[75] Inventor: Elden L. Hawkinson, Canoga Park, Calif.

[73] Assignee: Rockwell International Corporation, El Segundo, Calif.

[21] Appl. No.: 198,330

[22] Filed: Oct. 20, 1980

Related U.S. Application Data

[62] Division of Ser. No. 106,412, Dec. 21, 1979, abandoned.

[51] Int. Cl.³ .......................... B32B 5/26; B32B 5/32; B32B 5/16
[52] U.S. Cl. ................................. 428/240; 428/257; 428/313.5; 428/252; 428/287; 428/327; 428/407; 428/902; 428/911; 244/121; 220/900
[58] Field of Search ............... 428/902, 911, 306, 308, 428/325, 327, 257, 258, 237, 313.5, 252, 313.3; 244/121, 158 A; 220/900

[56] References Cited

U.S. PATENT DOCUMENTS

| | | | |
|---|---|---|---|
| 3,316,139 | 4/1967 | Alford et al. | 428/902 |
| 3,486,966 | 12/1969 | Allen et al. | 244/121 |
| 3,577,306 | 5/1971 | Baker et al. | 428/257 |
| 3,707,434 | 12/1972 | Stayner | 428/313.5 |
| 3,773,606 | 11/1973 | Worcester, Jr. et al. | 428/258 |
| 3,788,937 | 1/1974 | Ree | 428/325 |
| 3,819,461 | 6/1974 | Saffadi | 428/258 |
| 3,993,829 | 11/1976 | Park | 428/258 |
| 4,013,810 | 3/1977 | Long | 428/306 |
| 4,025,686 | 5/1977 | Zion | 428/327 |
| 4,095,008 | 6/1978 | Sundstrom | 428/306 |
| 4,183,097 | 1/1980 | Mellian | 428/911 |
| 4,268,562 | 5/1981 | Bacon et al. | 244/121 |
| 4,323,623 | 4/1982 | Ahrens et al. | 428/252 |

*Primary Examiner*—Alexander S. Thomas
*Attorney, Agent, or Firm*—H. Fredrick Hamann; Harry B. Field

[57] ABSTRACT

A protective laminate has high impact and heat resistance suitable for use as an exterior shield for missile structures and substructures. The laminate includes one or more outer plies of a resin-impregnated woven fabric made from high tensile strength fibers in which a majority of the fibers in each ply extend in the same direction. The laminate also includes one or more sub-plies of a resin-impregnated woven fabric made from high tensile strength fibers woven in a generally uniform pattern. Each of the sub-plies is coated with a separate layer of finely divided hollow microspheres. The woven fabric plies overlie one another and the resin system bonds the plies together at the interface between them to form the protective laminate. In one embodiment the fibers are aramid fibers and the resin system contains an elastomer to bind the fabric plies together in a rubbery matrix. The microspheres are crushable to absorb energy upon impact. The laminate is bonded to the outer wall structure of a missile, or other airborne vehicle, so the majority of the fibers in the outer plies extend in the same direction generally parallel to the longitudinal axis of the missile. The laminate can include an outer coating of an elastomeric material for added dust and rain erosion protection.

4 Claims, 2 Drawing Figures

LAMINATED SHIELD FOR MISSILE STRUCTURES AND SUBSTRUCTURES

CROSS-REFERENCE TO RELATED APPLICATIONS

This application is a division of Ser. No. 106,412 filed Dec. 21, 1979 now abandoned.

BACKGROUND

This invention relates to high impact resistant laminated sheet materials for use as an outer protective shield for the wall structures of airborne vehicles such as missiles.

Airborne vehicles, such as guided missiles and ballistic missiles, can travel at supersonic velocities. During supersonic flight the body of the missile can be damaged by impacts from pebbles and other debris. The missile body also can suffer damage from dust and rain erosion, as well as experiencing the usual aerodynamic heating. Damage from pebbles and other debris can be substantial from sizeable particles traveling at up to ballistic speeds.

It is desirable to form a missile shield as a single composite laminate that can be simply bonded to the exterior of the missile structure for providing the necessary protection.

A variety of materials in the form of protective laminates have been used to protect missile bodies from the aerodynamic heating experienced during missile flight, but these protective materials often do not offer suitable protection against the other hazards described above.

Reasonably low density materials are desirable in a protective laminate to ensure that overall weight and thickness of the protective material is reasonably low, as well as having a reasonable cost.

Thus, there is a need to provide a protective material for missiles in the form of a single composite laminate adapted for bonding to the exterior of the missile structure to protect it from rain and dust erosion and aerodynamic heating, while also protecting against high speed pebble and debris impact damage, without adding unwanted weight or cost to the total missile structure.

SUMMARY OF THE INVENTION

Briefly, one embodiment of this invention comprises a laminated protective sheet material having high impact and heat resistance, as well as impact absorbing capabilities. The laminate comprises a multiplicity of layers of sheet material, each layer being bonded to the adjacent layer at the interface between them to form a single composite laminate adapted for bonding to the exterior of a missile structure. The sheet material includes at least one ply of a first resin-impregnated high tensile strength fiber woven fabric having a majority of the fibers extending in one direction, and at least one ply of a second resin impregnated high tensile strength fiber woven fabric having its fibers in a more uniform pattern. A layer of finely divided hollow microspheres is coated onto and bonded to a surface of the second fabric layer. The resin impregnating the first and second fabric layers contains an elastomer for bonding the fabric layers together in an elastomeric matrix.

The laminate can protect the missile structure from dust and rain erosion and pebble and other debris impacts occurring during missile flight. The laminate can resist certain impact levels without appreciable damage, and for larger impacts the microsphere layer crushes to absorb a useful amount of impact energy to provide a reasonable level of protection for the underlying missile structure. The laminate also absorbs a useful amount of heat to provide a level of protection against aerodynamic heating.

In one form of the invention, the laminate is bonded to an exterior wall of a missile so that the majority of fibers in the first fabric layer extend generally parallel to the longitudinal axis of the missile structure.

Although a variety of materials can be used, unusually good results are provided by aramid fiber woven fabric layers bound together in a phenolic-nitrile resin matrix.

These and other aspects of the invention will be more fully understood by referring to the following detailed description and the accompanying drawings.

DRAWINGS

FIG. 1 is a schematic cross-sectional perspective view illustrating one embodiment of a protective laminated sheet material according to principles of this invention; and FIG. 2 is a schematic cross-sectional view showing the protective laminate bonded to a missile wall structure.

DETAILED DESCRIPTION

Figure 1:
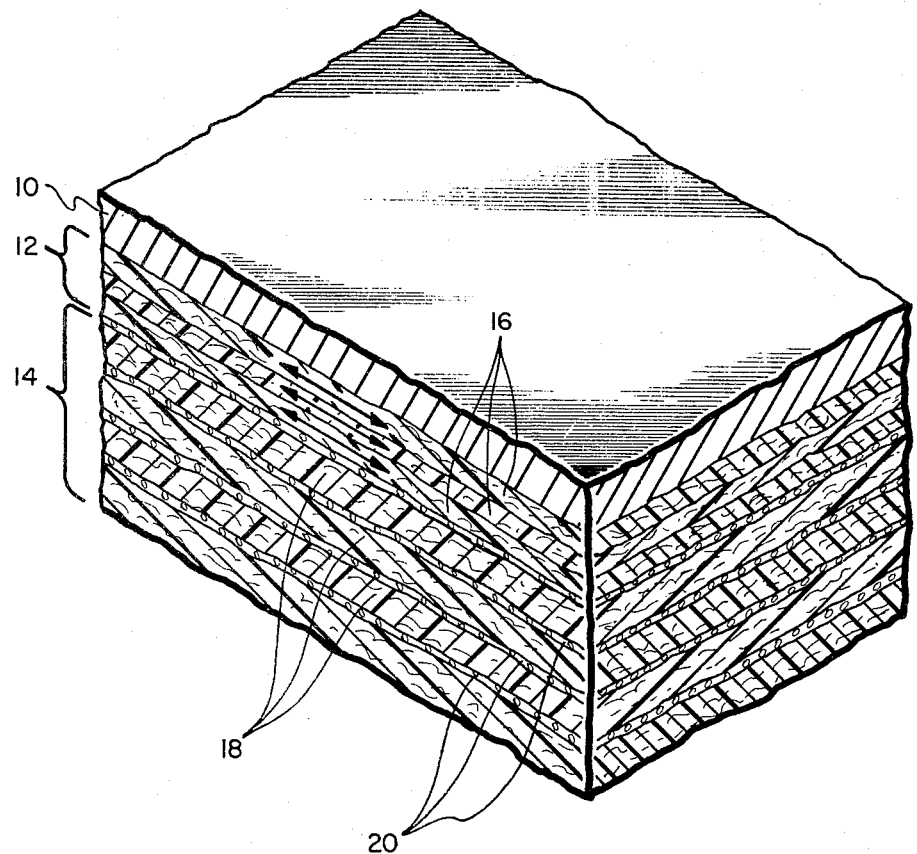
Figure 2:
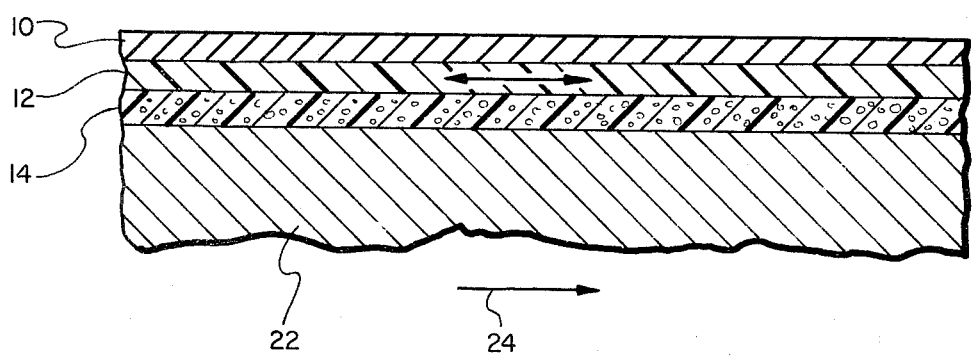

FIG. 1 is a schematic cross-sectional perspective view illustrating one embodiment of a protective laminated sheet material according to principles of this invention. The laminated sheet material comprises a multiplicity of planar sheets or plies overlying one another and bonded to each other at the interface between them. FIG. 2 illustrates the protective laminate bonded to the exterior surface of a substrate being protected.

The composite laminate generally comprises an elastomeric outer coating 10, a layer 12 of fiber woven fabric with essentially unidirectional high tensile strength fibers, and an energy-absorbing fiber woven fabric sub-layer 14 of high tensile strength fibers woven in a generally uniform pattern and having a surface coating of finely divided hollow microspheres. In the illustrated embodiment, the elastomeric coating 10 provides an exterior protective layer for the laminate. The unidirectional fabric layer 12 is sandwiched between the elastomeric coating and the fabric sub-layer 14. In many instances the elastomeric outer coating can be eliminated because the added level of protection that it provides is not required. The unidirectional layer 12, also is referred to herein as an outer fabric layer, inasmuch as it is located exterior to the sub-layer 14 when the laminate is bonded to a substrate.

The elastomeric coating 10 comprises a material that, in film form, is elastically stretchable, and when applied with a sufficient film thickness, the elastomeric layer also has a level of compressibility or energy-absorbing capability when impacted by a projectile. The elastomeric coating is a material that provides rain and dust erosion protection, and also can provide reasonable heat resistance without structural failure or loss of its elastomeric properties. The elastomeric layer can be in sheet form adhesively bonded to the surface of the outer fabric layer 12, or it can be in liquid form for being sprayed onto the surface of the outer fabric layer and hardened as a protective surface film. A desirable elastomeric material is a fluoroelastomer such as Viton, a trademark of E. I. DuPont de Nemours & Co. (Du- Pont). Viton is a transparent, solid, weather-resistant elastomer based on a copolymer of vinylidene fluoride and hexafluoropropylene. The elastomeric coating also can be an ethylene acrylic type elastomer such as Vamac, a trademark of DuPont.

The outer fabric layer 12 comprises one or more individual plies 16 of a high tensile strength fiber woven fabric, in which the majority of the fibers extend in one direction. Unusually good results, in terms of impact resistance, are obtained with a fiber woven fabric having at least about 80% to 90% of the fibers extending in the warp direction. This fabric is referred to herein as a unidirectional fabric, owing to the large amount of fibers extending in one direction. In the illustrated embodiment, the outer fabric layer comprises three plies 16 of unidirectional fabric overlying one another, with the principal fiber direction extending in the same direction in each ply.

The material used in the unidirectional fabric layer is a high tensile strength fiber with a tensile strength similar to that of steel, i.e., a tensile strength at least as high as about 400,000 p.s.i. The fibers also have a heat resistance greater than at least about 200° C., i.e., well above temperatures normally experienced during missile flight. The fiber material also is a low density material with a density lower than steel, to provide weight economy. The fibers also are non-metallic, i.e., an electrical insulator that is transparent to X-ray radiation. Especially good results are provided by aramid fibers, the generic name for aromatic polyamide fibers. These fibers have a tensile strength in the neighborhood of 400,000 p.s.i. In many instances this is greater than the tensile strength of steel wire, although high tensile strength piano wire has a tensile strength up to about 600,000 p.s.i. An aramid fiber woven fabric preferred for use as the unidirectional fabric layer is known as 143 style Kevlar 49 fabric, a trademark of DuPont. This fabric has approximately 90% of the aramid fibers extending in the warp direction, and the remaining tie-in fibers extending perpendicular to the principal fiber direction. This fabric has a composite tensile strength estimated to be more than 100,000 p.s.i. Each ply is approximately 0.010 inch thick.

Although other fabric or tape materials can be used, such as various thicknesses and weaves of materials, such as glass fibers, graphite, quartz and zirconia, aramid fibers are preferred because of their combination of extremely high tensile strength, low density and heat resistance.

The plies of unidirectional fabric are each impregnated with a synthetic resinous material for providing inter-ply adhesion. The resin system also has elastomeric properties as well as heat resistance to heat levels above about 200° C. A resin system that provides good results is a mixture of phenolic resin and a nitrile-based elastomer. In a presently preferred embodiment, the resin system comprises a mixture of CPH-2223 phenolic resin and Hycar nitrile elastomer sold by Ferro Corporation, Culver City, Calif. Good results in terms of elastomeric properties and heat resistance are obtained when the resin system comprises a mixture of about 40% to 60% phenolic resin and about 60% to 40% nitrile elastomer. Each ply of unidirectional fabric is pre-impregnated with the phenolic-nitrile resin in a partially cured state. The individual plies of the unidirectional fabric are then bonded to one another by overlying them and applying heat to cure the resin and bond the plies together at their interface.

The sub-layer 14 comprises one or more plies 18 of a high tensile strength fiber woven fabric. The individual fibers in each ply are preferably woven in a generally uniform pattern. In the illustrated embodiment, the sub-layer includes four plies of fiber woven fabric overlying one another and bonded together at their interface.

The fiber material used in the sub-layer comprises a fiber having high tensile strength, low density, high temperature resistance and non-conductive properties similar to the fibers in the outer layer 12. In a preferred embodiment, each ply in the sub-layer comprises an aramid fiber woven fabric layer known as 713 style Kevlar 29 sold by DuPont. The fibers of this fabric are woven in a square pattern, and can have a somewhat lower tensile strength than the fibers in the outer layer. Each fabric ply in the sub-layer has a thickness of about 0.015 inch.

A discrete layer 20 of finely divided hollow microspheres is coated onto and bonded to a surface of each ply 18 of the sub-layer. The preferred hollow microspheres are finely divided, hole-free, low density, spherical particles of synthetic resinous material, or similar film-forming materials. Phenolic microspheres, such as those known as Microballoons, a trademark of General Latex & Chemical Co., provide a good combination of low density and good thermal absorbing and impact energy absorbing properties.

The aramid fibers in each ply of the sub-layer are first impregnated with a synthetic resinous material having elastomeric and heat resistance properties similar to the elastomeric-resin system of the outer fabric layer 12. In a preferred embodiment, each ply of the fabric sub-layer is impregnated with a phenolic resin-nitrile elastomer, preferably the same mixture as in the outer fabric layer. Hollow microspheres are then coated onto one surface of the resin-impregnated fabric to uniformly coat the surface of the fabric. The microspheres are bonded to the surface of the fabric by the resin-elastomer. In the preferred composite laminate, the plies of the sub-layer are arranged with the microsphere-coated surface of each ply being uppermost, so the fabric sub-layer alternately comprises the microsphere layer and the aramid fiber layer. This arrangement is illustrated in FIG. 1.

The fiber woven fabric plies used in the outer layer and the sub-layer are impregnated with the resin in a partially cured state; and in forming the composite laminate, heat is applied to provide inter-ply bonding of the individual plies.

EXAMPLE 1

An experimental composite laminated sheet material similar to that illustrated in FIG. 1 was prepared and tested. The composite laminate comprised three plies of unidirectional 143 style Kevlar 49 aramid fiber woven fabric. Each ply was pre-impregnated with a resin system comprising a 50/50 blend of phenolic resin and nitrile-based elastomer. The resin was partially cured and contained approximately 35% by weight resin solids. The fabric sub-layer comprised four plies of 713 style Kevlar 29 aramid fiber woven fabric pre-impregnated with partially cured phenolic-nitrile resin. A uniform layer of phenolic microspheres was coated on one side of each ply in the sub-layer. The fabric plies in the sub layer were pre-impregnated with a 50/50 blend of phenolic resin and a nitrile based elastomer. The plies were first impregnated to a nominal resin solids content of 35% by weight. A mixture of 100 parts by weight of the phenolic-nitrile resin system (based on the resin solids) and 25 parts by weight phenolic microspheres were then colandered onto one surface of the resin-impregnated fabric to achieve a coated fabric that was nominally about 50% by weight fabric and about 50% by weight resin and microspheres. The pre-impregnated plies were overlayed as illustrated in FIG. 1 and the resin matrix was cured in a heated platen hydraulic press, according to the following steps. (1) The prepregnated plies were initially loaded into a cold press at contact pressure and heated to 250° F. (2) 75 p.s.i. cure pressure was applied and the platens held at a temperature of about 250° F. for about 30 minutes. (3) The press platen temperature was increased to 350° F. while maintaining 75 p.s.i. laminating pressure. (4) The 350° F. temperature and 75 p.s.i. pressure was held for one hour. (5) The heated press platens were then cooled to a temperature of 180° F. and held at 75 p.s.i. before removing the composite laminate from the press. The resulting laminate was then spray-coated with a white Viton coating at room temperature curing to provide an outer elastomeric coating 0.020-inch thick. The resulting laminate had a specific gravity of about 1.23, a total thickness of about 3.50 millimeters, a thermal conductivity of 0.206 W/m.K, and a heat capacity of 2385 J/Kg.K.

In use, the protective composite laminate is bonded to the exterior of a substrate 22 to be protected. The substrate can be the outer wall structure of a missile, or other airborne vehicle. The resin matrix in which the fabric plies are bound serves as an adhesive for bonding the composite laminate to the substrate using only an adhesive primer. When the composite laminate is used as a protective shield for the exterior of missile structure, the laminate is bonded to the missile so the principal fibers in the unidirectional plies extend in a direction generally parallel to the longitudinal axis of the missile, represented by the arrow 24 in FIG. 2.

The composite laminate, without the outer elastomeric coating 10, provides an unusually effective combination of rain and dust erosion resistance, impact resistance, impact energy absorption, and heat resistance, as well as reasonably low weight and low cost.

Dust erosion protection is provided by the outer unidirectional fabric layer. In a dust environment dust particles at high velocities can act as though they are sanding off the exterior surface of a missile. Rain also can be abrasive. The aramid fibers and the elastomeric-resin matrix combine to provide a level of dust erosion protection against these sanding or abrasive effects. The outer elastomeric coating of Viton or Vamac is not required for most dust and rain environments likely to be encountered during missile flight. However, they can be used for environments requiring additional levels of rain or dust erosion protection.

The composite laminate is particularly effective in resisting impacts from pebbles or other similar debris traveling at ballistic speeds. The high-strength unidirectional aramid fibers at the exterior, being bound in a rubbery matrix, with an energy-absorbing sub-layer, combine to provide a trampoline effect which can cause an impacting projectile to bounce off the shield, while dissipating impact energy along the missile axis to avoid point loading from the impacting projectile.

The aramid fiber layer, owing to the principal fiber direction being aligned parallel to the long axis of the missile, greatly reduces erosion damage and tearing of the composite laminate. The fibers at the exterior of the shield are oriented primarily in the direction that an impacting object is most likely to come from, namely axially with respect to the vehicle. Consequently, an impacting projectile impinges on the shield in the same direction as the fiber length, tending not to cut across fibers in the protective shield. The result is that the projectile in most instances bounces off the protective shield, or at most slightly deforms the shield and the missile wall structure, or scuffs the exterior fiber layer, rather than tearing the fibers.

The microsphere layer provides an insulating layer of low thermal conductivity for protecting the missile structure against aerodynamic heating likely to be encountered during missile flight. The density of the microsphere layer can be accurately controlled, which, in turn, results in accurate control of the thermal conductivity and heat capacity of the composite laminate.

The microsphere layer also provides an impact absorbing layer that inhibits damage to the underlying missile structure. The microspheres are crushable under impact. By crushing the microsphere layer is therefore able to absorb a useful amount of impact energy that would otherwise be transferred directly to the underlying missile structure. The rubbery matrix, in which the fiber layers are bound, also is resilient and deformable under impact loads directed at the missile structure and therefore provides an added level of impact absorption.

X-ray protection also can be optionally provided by the same composite laminate. A filler such as barium sulfate, which is capable of absorbing X-ray radiation, can be uniformly dispersed throughout the resin system; or a separate ply of X-ray-resistant material, such as stainless steel, can be used for protection against X-ray radiation. However, it has been discovered that a protective laminated structure that is transparent to X-ray radiation is more useful as an exterior missile shield. X-rays create a heating problem at the skin of the missile, which is similar to a large mechanical force or impulse applied ot the missile structure. By transmitting as much X-ray radiation as possible through the shield, rather than absorbing it, the shield creates as little impact force at the skin of the missile as possible. Interior shielding for X-ray radiation is believed more effective than shielding such radiation by a protective exterior layer on the missile wall structure.

EXAMPLE 2

The composite laminate described in Example 1 was bonded to a graphite fiber-reinforced epoxy substrate using a low temperature curing epoxy adhesive. The laminated substrate was used in gas and powder gun facilities to evaluate the pebble impact level of the composite material. Table 1, set forth below, shows the results of comparative pebble impact tests, in which the composite protective laminate of this invention was compared with acrylonitrile rubber and a foamed silicone material, referred to as PD-200 in Table 1. The substrate material used in the tests was an aerospace structural material of the type used for payload bodies. The substrate and test material were placed at an impact angle, and either an air gun or powder gun (depending on particle velocity desired) was fired to impact the test material with a granite particle having sharp ends. The projectile is fired without tumbling and strikes at a calibrated speed and angle. The test material was then visually observed following each test to determine its resistance to pebble impact. The tests showed that the protective laminate of this invention was not penetrated by the test projectile. Some denting of the metal substrate was observed, but only scuff marks on the protective laminate were observed. By comparison, unacceptable surface indentations were formed in the nitrile rubber test material, and unsuitable face sheet penetration and ripping of the silicone test material resulted.

EXAMPLE 4

Subsequent pebble impact tests were conducted using four different test specimens: (1) a laminate as described in Example 1, but without the outer elastomeric (Viton) coating; (2) the laminate of Example 1 with the outer

TABLE 1

PEBBLE IMPACT TESTS

| SHOT NO. | PROTECTION SYSTEM | SUBSTRATE FACESHEET THICKNESS | PROJECTILE SIZE (IN.) | IMPACT VELOCITY (PPS) | IMPACT ANGLE (DEGREES) |
|---|---|---|---|---|---|
| 1 | NITRILE | 0.031 IN. | 5/8 | 944 | 12.5 |
| 2 | NITRILE | 0.031 IN. | 7/8 | 493 | 25 |
| 3 | PD-200 | 0.031 IN. | 5/8 | 900 | 12.5 |
| 4 | PD-200 | 0.031 IN. | 7/8 | 411 | 25 |
| 5 | KPN | 0.031 IN. | 5/8 | 1012 | 12.5 |
| 6 | KPN | 0.031 IN. | 5/8 | 995 | 12.5 |
| 7 | KPN | 0.031 IN. | 5/8 | 450 | 25 |
| 8 | KPN | 0.031 IN. | 7/8 | 416 | 25 |
| 9 | KPN | 0.065 IN. | 7/8 | 375 | 25 |
| 10 | KPN | 0.065 IN. | 7/8 | 375 | 25 |

| SHOT NO. | SURFACE EVALUATION INDENTATION (INCHES) | | | FACESHEET PENETRATION | NDT EVALUATION % OF SURFACE AREA ANOMALIES (APPROXIMATELY) | RESIDUAL STRENGTH CAPABILITY** |
|---|---|---|---|---|---|---|
| | AVG. LENGTH | WIDTH | AVG. DEPTH | | | |
| 1 | 1.7 | 0.4–0.7 | 0.05 | NO | 7 | TBD |
| 2 | 3.0 | 0.7–1.1 | 0.10 | NO | 8 | TBD |
| 3 | 5.1 | 0.5–1.4 | 0.4 | YES | N/A | — |
| 4 | 3.2 | 0.5–1.3 | 0.5 | YES | N/A | — |
| 5 | SA* | SA | SA | NO | 40 | 70% |
| 6 | SA* | SA | SA | NO | 13 | 70% |
| 7 | SA* | SA | SA | NO | 8 | TBD |
| 8 | SA* | SA | SA | NO | 90 | TBD |
| 9 | SA* | SA | SA | NO*** | 10 | TBD |
| 10 | SA* | SA | SA | NO | 8 | TBD |

KPN = KEVIAR-PHENOLIC-NITRILE LAMINATE
*SA = SLIGHT ABRASION
**PERCENT OF NONDAMAGED CONTROL SPECIMEN COMPRESSIVE STRENGTH
***FACESHEET LOCALLY FRACTURED
TBD = TO BE DETERMINED
NDT = NON-DESTRUCTIVE TESTING

EXAMPLE 3

Dust erosion tests were conducted using three different test specimens: (1) a laminate as described in Example 1, but without the outer elastomeric (Viton) coating; (2) the laminate of Example 1 with a 0.005-inch (0.13 mm) thick Viton coating; and (3) the laminate of Example 1 with a 0.020-inch (0.57 mm) thick Viton coating. These test samples were impacted with dust particles of both 0.65 and 0.05 mm diameter; with dust velocities varying from 732 to 1189 m/sec; and impact angles of 4, 9, 14, 15, 20 and 30 degrees. Generally, the test results showed that the dust erosion resistance of the composite laminate without the elastomeric coating was as good or better than the resistance of the laminates with the elastomeric coatings.

elastomeric (Viton) coating; and (3) and (4) the laminate of Example 1 in which the outer Viton coating was replaced with a 0.030-inch thick outer ply of Vamac elastomer applied during laminate fabrication in both cured and uncured states, respectively as the outer laminate ply. No added adhesive other than the uncured resin of the preimpregnated Kevlar fabric was used to bond the Vamac elastomeric sheets to the laminate. Results of these pebble impact tests are set forth in Table 2 below. These tests generally showed that the Vamac coating improved impact resistance somewhat when compared with the Viton coating, but the laminate without the outer elastomeric coating had an impact resistance at least as good, and in some instances better than with the elastomeric coatings.

TABLE 2

PEBBLE IMPACT TESTS

| SHOT NUMBER | PEBBLE DIAMETER (mm) | PEBBLE WEIGHT (g) | VELOCITY (m/s) | IMPACT ANGLE (deg) | SPECIMEN | DAMAGE/COMMENTS |
|---|---|---|---|---|---|---|
| 1 | 15.875 | 5.479 | 268 | 15 | KPN | Slight dent and scuff |
| 2 | 3.175 | 0.066 | 701 | 6 | KPN | Light scuff no dent |
| 3 | 15.875 | 5.493 | 107 | 33.5 | KPN | Slight dent and scuff |
| 4 | 15.875 | 5.510 | 229 | 20 | KPN$^a$ | 4.25 mm dent, slight scuff |
| 5 | 15.875 | 5.493 | 213 | 20 | KPN | Slight dent and scuff |

TABLE 2-continued

PEBBLE IMPACT TESTS

| SHOT NUMBER | PEBBLE DIAMETER (mm) | PEBBLE WEIGHT (g) | VELOCITY (m/s) | IMPACT ANGLE (deg) | SPECIMEN | DAMAGE/COMMENTS |
|---|---|---|---|---|---|---|
| 6 | 15.875 | 5.499 | 107 | 33.5 | KPN | Slight dent and scuff |
| 7 | 15.875 | 5.413 | 195 | 20 | KPN[b] | d |
| 8 | 15.875 | 5.507 | 207 | 20 | KPN[c] | d |
| 9 | 15.875 | 5.501 | 110 | 33.5 | KPN[b] | Slight dent and scuff |
| 10 | 15.875 | 5.510 | 101 | 33.5 | KPN[c] | Slight dent and scuff |

[a]White Viton outer coating
[b]Uncured Vamac 25 over KPN aluminum isogrid
[c]Curec Vamac 25 over KPN aliminum isogrid
[d]Pebble scraped Vamac coating off KPN and made a slight dent.

EXAMPLE 5

Thermogravametric analysis was conducted for laminates according to Example 1, but without the outer elastomeric (Viton) outer coating. The tests were conducted on laminates with the cure schedule described in Example 1, and separately, with an added post cure of four hours at 350° F. The tests were conducted for both air and nitrogen environments. The test data indicated very little material decomposition for temperatures up to about 410° C. The post cure is carried out in an environment without augmented pressure. That is, the laminate is initially cured when pressure is applied in a heated press. The post cure is then carried out separately in an oven vented to the atmosphere. The post cure can be eliminated by curing the laminate entirely in an autoclave, for example, where the entire cure cycle permits gases evolved during cure to vent to the atmosphere. The test data showed that post curing reduced the sudden increase in thermal decomposition (high temperature blowoff) of the laminate in air when compared with the laminate that is not post cured, or autoclave cured.

It is to be understood that what has been described is merely illustrative of the principles of the invention and that numerous arrangements in accordance with this invention may be devised by one skilled in the art without departing from the spirit and scope thereof.

I claim:

1. An impact protected missile structure comprising:
   a structural wall of a missile having a longitudinal axis;
   a protective composite laminate comprising multiple layers bonded to each other at the interface between them, the laminate having an outer fabric layer with at least one first ply of aramid fiber woven fabric having at least about 80% to 90% of the fibers extending generally parallel to the longitudinal axis of the missile wall structure; a fabric sub-layer having at least one second ply of aramid fiber woven fabric, the fibers woven in a more uniform pattern than the outer fabric layer; a layer of finely divided hollow microspheres coating a surface of the second fabric layer; and a synthetic resinous material containing an elastomeric component binding the outer fabric layer, the fabric sub-layer and the layer of microspheres together in a rubbery matrix; and
   means bonding the laminate to the exterior of the missile wall structure so the outer fabric layer is on the side of the fabric sub-layer opposite the missile wall structure.

2. The missile structure according to claim 1 including multiple first plies of aramid fiber woven fabric overlying one another and bonded to each other with the principal fiber direction of each ply being in the same general direction.

3. The missile structure according to claim 1 in which the microsphere layer comprises phenolic microspheres.

4. The missile structure according to claim 1 in which elastomeric resinous matrix comprises a mixture of phenolic resin and a nitrile elastomer.

* * * * *